United States Patent Office 3,255,145
Patented June 7, 1966

3,255,145
ORGANOPHOSPHORUS COMPOSITIONS
Arthur Derrick Bray Graham, Baton Rouge, La., assignor to Ethyl Corporation, New York, N.Y., a corporation of Delaware
No Drawing. Filed Aug. 30, 1962, Ser. No. 220,544
7 Claims. (Cl. 260—30.6)

The present invention relates to new and novel organophosphorus compositions. In particular, the invention relates to new and novel compositions formed by impregnation of plastics, textiles, cellulosic materials and paper with halogenated organophosphorus esters to form in effect a whole new family of flame resistant compositions.

While organophosphorus compounds are known and used for numerous diverse purposes only a few such compounds are suitable for flame-proofing purposes. Moreover, even where such compounds do show flame-proofing possibilities they are generally lacking in other vital properties essential for their major success as flame-proofing additives. Thus, for example, even though a particular compound, such as a halogenated organophosphorus compound, may provide satisfactory flame retardancy, it may cause photochemical degradation, reduce low temperature flexibility and almost invariably produces other undesirable effects. One notable deficiency of such compounds is that of thermal instability. Thus, on many occasions even though a compound may exhibit quite satisfactory flame-retarding properties hydrogen halide can be evolved from a material impregnated with such compound when the material is heat treated. This property is obviously quite undesirable and, among other things, produces corrosion problems because the metal parts of processing apparatus are attacked by the hydrogen halide.

Another objectionable feature of prior art practice is that present methods of producing many of the organophosphorus compounds are inherently expensive and therefore, even when the organophosphorus compounds in question are capable of providing some flame-proofing properties to an article the compound may be quite impractical from a cost-effectiveness standpoint. Among the reasons for the inherent expensiveness of these compounds is that quite often yields of the desired organophosphorus compound are undesirably low and formation of by-products undesirably high. In addition to wasting the starting material by formation of by-products, per se, the by-products sometimes compete in the reaction and even further lessen the yield of the desired organophosphorus compound. Another reason for the inherent expensiveness of these compounds is that the starting materials themselves are often quite expensive and are difficult to manufacture.

There exists then an important need in the art for both new and improved flame resistant compositions. In particular, there exists a need for new flame-proofed compositions or articles of manufacture formed by impregnation of various compounds, particularly plastics and resins, from these flame-retardant compounds.

An objective of the present invention is therefore to overcome these prior art deficiencies by providing new and novel flame-resistant compositions formed with organophosphorus esters admirably suited for use as plasticizers as well as flame retardant compounds; which compounds can be prepared conveniently and economically. In particular, it is among the objects of this invention to provide a new class of flame retardant self-extinguishing plastic compositions formed from non-burning halogenated organophosphorus compounds. Specifically, there is provided, pursuant to this invention, flame-resistant compositions of matter formed from various plastics and resins, textiles, cellulosic and paper materials.

New and novel flame-resistant compositions are formed pursuant to the present invention by incorporation of a bis[di($\beta$-halo-hydrocarbyl)phosphonato]ethane compound into a normally flammable organic substance in quantities ranging from about 0.5 to about 50 weight percent, and more, dependent upon the particular usage and degree of flame-proofing characteristics desired. The bis[di($\beta$-halo-hydrocarbyl)phosphonato]ethane compound is characterized by the following formula:

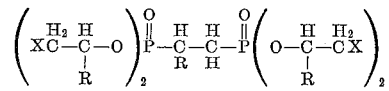

wherein R is selected from a group consisting of hydrogen and hydrocarbon radicals containing from one to about six carbon atoms characterized further as alkyls and aryl, and X is a halogen of atomic number ranging from 17 to 35.

Thus, the radicals of the molecule bonded through oxygen to phosphorus contain from 2 to about 8 carbon atoms and are halo substituted on a beta carbon atom by either a chlorine or bromine atom. That portion of the molecule bonded directly through carbon to phosphorus provides an ethane nucleus which can be substituted on one carbon atom by substitution of a hydrogen with a hydrocarbyl radical which can contain from one to about six carbon atoms which are characterized as alkyl or aryl. The R's can be the same or different but are generally the same and where R is hydrocarbyl (hydrocarbon) it can be, for example, methyl, ethyl, amyl, hexyl, phenyl, or the like. The R hydrocarbyl radical can even be substituted as with halogen or other elements and moieties provided that these are inert in the molecule.

Illustrative of the novel compounds which form the compositions of the present invention—viz., the bis[di($\beta$-halohydrocarbyl)phosphonato]ethane—are 1,2-bis[di($\beta$-chloroisopropyl)phosphonato]propane,
1,2-bis[di($\beta$-chloroethyl)phosphonato]ethane,
1,2-bis[di($\alpha$-butyl-$\beta$-chloroethyl)phosphonato]hexane,
1,2-bis[di($\alpha$-butyl-$\beta$-bromoethyl)phosphonato]hexane,
1,2-bis[di($\alpha$-phenyl-$\beta$-chloroethyl)phosphonato]octane,
1-phenyl-1,2-bis[di($\alpha$-phenyl-$\beta$-bromoethyl)phosphonato]ethane,
1,2-bis[di($\beta$-chloroethyl)phosphonato]ethane, and
1,2-bis[di($\beta$-bromoethyl)phosphonato]ethane.

These classes of compounds are formed by heating to produce dimerization of a bis($\beta$-halo-$\alpha$-hydrocarbyl)$\beta'$-halo-$\alpha'$-hydrocarbyl ethyl phosphonate characterized by the following structural formula:

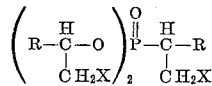

wherein R is selected from the group consisting of hydrogen and hydrocarbyl radicals containing from one to about six carbon atoms characterized further as alkyls and aryl and wherein X is a halogen of atomic number ranging from 17 to 35. Illustrative of such compounds are Bis($\beta$-chloroisopropyl)$\beta'$-chloroisopropyl phosphonate,
Bis($\beta$-bromoisopropyl)$\beta'$-bromoisopropyl phosphonate,
Bis($\beta$-chloroethyl)$\beta'$-chloroethyl phosphonate,
Bis($\beta$-chloro-$\alpha$-ethyl ethyl)$\beta'$-chloro-$\alpha'$-ethyl ethyl phosphonate,
Bis($\beta$-chloro-$\alpha$-butyl ethyl)$\beta$-chloro-$\alpha'$-butyl ethyl phosphonate,
Bis($\beta$-bromo-$\alpha$-phenyl ethyl)$\beta'$-bromo-$\alpha'$-phenyl ethyl phosphonate, and
Bis($\beta$-chloro-$\alpha$-phenyl ethyl)$\beta'$-chloro-$\alpha'$-phenyl ethyl phosphonate.

These phosphonates are generally prepared as by-products from phosphite compounds of the following structural formula

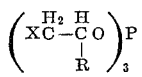

wherein R is selected from the group consisting of hydrogen and hydrocarbyl radicals containing from one to about six carbon atoms characterized further as alkyls and aryl and wherein X is a halogen of atomic number from 17 to 35. Illustrative of such phosphite compounds are tris($\beta$-chloro-isopropyl)phosphite, tris($\beta$-chloro-ethyl)phosphite, tris($\beta$-bromo-isopropyl)phosphite, tris($\beta$-bromo-$\alpha$-ethyl ethyl)phosphite, tris($\beta$-chloro-$\alpha$-propyl ethyl)phosphite, tris($\beta$-bromo-$\alpha$-phenyl ethyl)phosphite, tris($\beta$-chloro-$\alpha$-phenyl ethyl)phosphite and the like.

In a preferred embodiment of the present invention flame-resistant compositions are formed by impregnation of normally flammable organic substances with mixtures of the bis[di($\beta$-halohydrocarbyl)phosphonato]ethane compounds and halogenated organic phosphonate esters characterized by the following structural formula

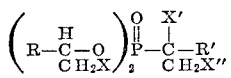

wherein R is selected from the group consisting of hydrogen and monovalent hydrocarbon radicals containing from one to about six carbon atoms, R' is a monovalent hydrocarbon radical containing from one to about six carbon atoms, X is a halogen selected from chlorine and bromine, X' is bromine and X" is selected from the group consisting of chlorine, bromine and cyano. Thus, the radicals of the molecule bonded through oxygen to phosphorus contain from two to about eight carbon atoms and are halo substituted on a beta carbon atom by either a chlorine or bromine atom. The radical of the molecule bonded directly through carbon to phosphorus is bromine substituted on the alpha carbon atom and is substituted on the beta carbon atom with a member selected from bromine, chlorine and cyano. As to R', and to R where R is a hydrocarbon radical, the hydrocarbon radical can contain from one to about six carbon atoms and can be alkyls or aryl. Thus R and R' can be, for example, methyl, ethyl, amyl, hexyl, or phenyl. The R and R' radicals can even be substituted as with halogen or other elements or moities provided that these are essentially inert in the molecule. Where R is a hydrocarbon radical it is preferable that R be the same as R' because preparation of such products offers advantages.

The components of the mixture can be blended in all proportions but preferably the component present in least amount should be at least about 10 weight percent of the other.

In accordance with a particularly preferred embodiment of the present invention a mixture of flame retardant additives are provided by heating an ester of the formula

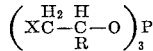

wherein X is a halogen of atomic number ranging from 17 to 35 and R is selected from hydrogen and hydrocarbyl radicals containing from one to about six carbon atoms chacterized further as alkyls and aryl. These compounds are heated to a temperature of from about 130° C. to about 250° C. for a period from about 0.5 to about 30 hours to produce a product which is a mixture of volatile compounds and a substantially involatile residue. After removal of the volatile fraction by distillation at a temperature of up to about 130° C., the involatile residue is reacted with a caustic, such as caustic soda. Preferably, in conduction of the reaction an alkali-metal hydroxide is dissolved in water; solutions ranging from about 5 to about 30 weight percent of the hydroxide in water being most preferred. Following this treatment, the total reaction mixture is treated, at a temperature ranging from about 0° C. to about 60° C., with a compound selected from the group consisting of bromine, bromine chloride, and cyanogen bromide. Preferably the reaction is conducted in the presence of an inert solvent. The resulting mixture of products, whose complete identity is not known, provides an excellent flame retarding additive mixture for use pursuant to the present invention.

In its most preferred form the above reactions are conducted by heating the phosphite at a temperature ranging from about 160° C. to about 190° C., then by separating the volatile fraction by distillation at about 130° C., after which time the involatile fraction is treated preferably at from about 20° C. to about 50° C. with aqueous alkali metal hydroxide in from about 5 to about 15 weight percent concentration of the hydroxide in water. Following this the total resultant reaction mixture is mixed at about 20° C. to about 50° C. with the bromine, bromine chloride or cyanogen bromide which, preferably, is dissolved in an inert solvent.

Because of the particularly high effectiveness of these flame retardant mixtures, especially from a cost-effectiveness standpoint, the best mode of practicing the invention calls for the production of a mixture of flame retardant additives by heating, preferably at a temperature ranging from about 160° C. to about 190° C., tris($\beta$-chloro-isopropyl)phosphite to produce a spectrum of products. A volatile portion of these products are first separated by distillation at atmospheric pressure at a temperature of up to about 130° C. The residual products are then treated by heating, at from about 20° C. to about 50° C. with an alkali-metal hydroxide, preferably sodium hydroxide. Following this treatment, the residual mixture of products is treated by contacting at from about 0° C. to about 60° C.; and preferably from about 20° C. to about 50° C., with a compound selected from the group consisting of bromine, bromine chloride and cyanogen bromide. The resultant mixture of compounds is highly effective as flame-retardant additives for normally flammable organic substances and can be used in wide porportions in forming flame-resistant compositions in accordance with the present invention.

In accordance with this invention the flame-retarding agents, viz., the bis[di($\beta$-halo-hydrocarbyl)phosphonato]ethanes—are added to or incorporated within numerous normally flammable organic substances such as textiles, cellulosic materials, paper, cardboard, plastics, resins and the like to impart flame resistant properties to these materials. The quantity of the agent used is dependent upon the nature of the material to which it is added and upon the degree of flame-proofing desired. Generally the agent is added in amounts ranging from about one-half to about 50 parts by weight, and higher. The use of these agents in flammable plastics and resins constitutes a preferred embodiment of the present invention. For example, these agents are added to and incorporated within the organic polymerizable mixtures to produce flame retardant polymers. Accordingly, dependent upon the particular use, from one-half to about fifty parts by weight of the flame-retarding agent, or mixtures of these agents, is added per 100 parts by weight of the sum total of the polymerizable mixture. Thus, the flame retarding agent can be added to the polymerization recipe and is incorporated within the plasticizable material while the material is insufficiently polymerized to form a wholly solid polymer. The flame-retardant agent becomes a part of the polymerizable mixture and after polymerization is a part of the plastic material that is produced.

The invention finds particular application in the production of flame-retardant resins and plastics from organic polymerizable monomers such as polystyrenes, polyvinyl acetate, polyvinyl chloride, polyformaldehyde (poly oxy methylene), polymethyl methacrylate, epoxy resins, unsaturated polyesters, and polyurethane foams. Other useful flame retardant plasticized articles of manufacture made pursuant to the practice of the present invention are those plastics made from acrylonitrile, vinylidene chloride, neoprene and rubber. The additives also have utility for copolymers of these and various other plastic materials such as the polyformaldehyde cyclic ether copolymers, vinyl chloride copolymers, vinylidene chloride copolymers, and the like. These flame resistant polymers and copolymers can also be used with other polymers and copolymers.

A particularly preferred class of flame-resistant compositions prepared by incorporation therein of the novel flame-retardant agents of this invention are those plastic compositions formed or derived from organic polymerizable monomers having ethylenic double bonds, and those with several such bonds as for example conjugated dienes such as butadiene, isoprene, dichlorobutadiene, 2-chloro-1, 3-butadiene; and also for example, vinyl acetate, vinyl chloride, vinylidene chloride, acrylonitrile, methyl styrene, para-chlorostyrene and the like. Preferably from about one-half to about 25 parts of the flame-retardant agent is employed per 100 parts of the organic polymerizable monomer. In most applications it is best to employ from about 5 to about 15 parts of the agent for 100 parts of polymerizable monomer but greater amounts than 25 parts, per 100 parts of monomer can be employed.

Example I

A glass-lined reaction vessel is fitted with a reflux condenser, stirrer and a thermal regulator. Hot oil is circulated around the outer extremities of this vessel. To the vessel is charged 200 parts of tris($\beta$-chloroisopropyl)phosphite. The temperature of the vessel is then raised to 167-169° C. and this temperature maintained throughout the reaction. At the end of 5 hours and 7 minutes it is found that 95.7 percent of the tris($\beta$-chloroisopropyl)-phosphite has been converted to the reaction products. A substantial portion of the remaining involatile residue is found to be bis($\beta$-chloroisopropyl)-$\beta'$-chloroisopropyl phosphonate.

The reaction mixture is then cooled and to the mixture is added a 3 molar aqueous solution of sodium hydroxide. The temperature of the resultant mixture is then raised to 50° C. and reaction conducted for a period of 20 hours. A portion of the residual products is bis($\beta$-chloroisopropyl)propenyl phosphonate and 1,2-bis[di($\beta$-chloroisopropyl)phosphonato]propane.

To this mixture is then added a carbon tetrachloride solution containing bromine. The reaction mixture is agitated for a few hours to assure complete reaction and then the excess bromine is removed by washing with sodium thiosulfonate. The organic layer is then separated from the aqueous liquid phase by decanting. A portion of the organic layer is blended with polystyrene molding powder and styrene monomer as follows.

Polystyrene molding powder and styrene monomer are then mixed together in the proportions of about 3.4 parts of powder to 5 parts monomer, and the mixture stirred for several hours in a mixing vessel until a homogeneous solution is formed. To 85 parts of the homogeneous mixture is then added 1.5 parts by weight of the organic mixture, 1 part benzoyl peroxide and 7 parts of petroleum ether. This mixture is polymerized by heating in an hermetically sealed vessel for 70 hours at 50° C., followed by a 20-hour period of heating at 70° C. A powdery material is thus formed. The powder is then pre-expanded by heating in a flow of steam for 3 minutes to give a bulk density approximating 3 pounds per cubic foot. Such pre-expanded granules are next placed in a vessel filled with boiling water and heated for 10 minutes. At the end of this period the material is cooled in air to a temperature of 25° C. A piece of the polymerized solid is tested and found to be essentially nonburning.

Example II

When 20 parts of 1,2-bis[di($\beta$-chloroethyl)phosphonato]ethane per 100 parts of the plasticizable mixture are substituted for the above organic mixture in the formulation described in the preceding example, and a molding is prepared from the polymerized material in similar manner. A strip from the molding is found to have very good flame retardant properties.

Example III

One molar quantity of bis($\alpha$-n-butyl-$\beta$-chloroethyl)-$\alpha'$-n-butyl-$\beta'$-chloroethyl phosphonate, which is prepared by reaction of 1,2-epoxy hexene and phosphorous oxychloride, is placed in a vessel operatively associated with a second vessel equipped with a stirring device, reflux condenser, temperature measuring means, and a hot oil bath heating means. The system is thoroughly purged with nitrogen after which time a small quantity of the said phosphonate is introduced from the first vessel into the second vessel and heated to 175° C. Initiation of the reaction is indicated by a sharp rise in the temperature of the contents of the vessel. The temperature is held constant at about 175° C. by incremental addition of the phosphonate or additions at a rate sufficient to maintain the desired temperature.

When the reaction is complete the cooled product is washed with a 5 percent aqueous solution of sodium hydroxide and then reacted with a 3 molar aqueous sodium hydroxide solution at 50° C. for a period of 18 hours. When the reaction is complete, the organic layer is separated from the aqueous layer, is washed with water, then dried and distilled under reduced pressure. There is yielded as the major product bis($\alpha$-amyl-$\beta$-chloroethyl)-M-hexene-2-phosphonate. 1,2 - bis[di($\alpha$-n-butyl-$\beta$-chloroethyl)phosphonato]hexane is also obtained in 15–30 percent yield upon separation from the organic mixture.

Five parts chloroprene rubber and 5.4 parts of polystyrene are placed in a vessel and then dissolved in 120 parts of styrene monomer. To this mixture is then added 3 parts of the 1,2-bis-[di($\alpha$-butyl-$\beta$-chloroethyl)phosphonato]hexane, 5 parts dry benzoyl peroxide and 12 parts petroleum ether. This mixture is heated for approximately 100 hours at 57° C., at the end of which time it is heated for an additional 20 hours at 70° C. From a portion of the residual solid product, in the form of discrete particles resembling molding powder, a molding is prepared by heating for three minutes in boiling water. The pre-expanded powder provides a bulk density of approximately 2.8 pounds per cubic foot. A portion of these pre-expanded granular particles is placed in a mold and boiled in water for 10 minutes. At the end of this time, the portion of the reaction mixture is rapidly cooled in cold water to a temperature of 25° C. A strip of the molding prepared from the polymerized material is found to provide very good flame-retardant properties.

Example IV

Bis($\alpha$ - n-butyl-$\beta$-bromoethyl)-$\alpha'$-n-butyl-$\beta'$-bromoethyl phosphonate is prepared by reaction between phosphorus tribromide and 1,2-epoxy hexane. One molar portion of this phosphonate is incrementally fed into a glass-lined vessel equipped with a stirring device, thermometer, reflux condenser and hot oil heating means. The vessel is purged with nitrogen to remove all traces of air after which time the feeding of the said phosphonate is begun. The phosphonate is fed into the reaction vessel so as to maintain a reaction temperature of about 175° C.

When the reaction is complete the cooled product is washed with a 5 percent sodium hydroxide aqueous solution, then reacted with a 3 molar aqueous sodium hydroxide solution at 50° C. for 18 hours. When the reaction is complete the organic layer is separated from the aqueous layer, washed with water, dried and distilled under vacuum to yield as the major product bis(α-phenyl-β-chloroethyl)-M-hexene-2-phosphonate. The viscous product 1,2-bis[di(α-n-butyl-β-bromoethyl)phosphonato] hexane is separated from the mixture in 15–30 percent yield.

Three parts of the 1,2-bis[di(α-butyl-β-bromoethyl) phosphonato]hexane are substituted for the same quantity of the ester used in Example III. A molding powder is produced as in the foregoing example. A molding produced from this material is found to have good flame-retardant properties.

In the following examples, films of 10 millimeter thickness were cast or formed in the following compositions:

Polyvinyl chloride—100 parts.
Plasticizer—50 parts.
Organotin stabilizer—4 parts.

These films were formed by adding the foregoing composition, in 10 weight percent concentration, to tetrahydrofuran. This solution was then evaporated to dryness in a hood. Test strips were formed from this material and observations were made as regards compatibility (clarity) and plasticizing efficiency (flexibility). Also 0.5 inch by 6 inch strips were submitted to an ASTM D–1433–58 flame-resistance test.

*Example V*

To illustrate the effectiveness of the novel compounds as plasticizers and as flame retardants for polyvinyl chloride 1,2 - bis[di(β-chloroisopropyl)phosphonato]propane was employed as the plasticizer. Upon direct application of a flame it was found that the sample would not support combustion. As soon as the flame was removed, burning, if any had in fact, occurred, immediately ceased. The polyvinyl chloride sample was thus rendered flame-resistant.

Moreover the sample was found to be quite clear, evidencing no signs whatever of incompatibility. Further, the sample was found to be quite flexible. Thus, the sample excelled in compatibility and efficiency, and was non-burning.

In sharp contrast to the foregoing example, however, when four of the widely used commercial plasticizers were used in lieu of 1,2-bis[di(β-chloroisopropyl)phosphonato]propane very poor results were obtained.

When the foregoing Example V was repeated except that dioctyl phthalate, tricresyl phosphate, tris(2,3-dibromopropyl)phosphate and trichloroethyl phosphate were used, respectively, as plasticizers in the same polyvinyl chloride and in the same proportion the following results, shown in the table, were obtained.

TABLE.—PLASTICIZERS NOT OF THE PRESENT INVENTION

| Plasticizer | Compatibility | Efficiency | Flame Resistance |
| --- | --- | --- | --- |
| Dioctyl phthalate | Slightly foggy | Very flexible | Burning rate 40–45" per minute. |
| Tricresyl phosphate | do | do | Nonburning. |
| Tris(2,3-dibromopropyl) phosphate. | Clear-spews | Slightly stiff | Do. |
| Trichloroethyl phosphate. | Very foggy | Very flexible | Do. |

From the comparison of the results of Example V with the foregoing results (table) it is seen that 1,2-bis[di(β-chloroisopropyl)phosphonato]propane is an excellent plasticizer, has excellent compatibility and plasticizing efficiency. On the other hand, however, the plasticizers not of this invention (shown in the table) are lacking in the extremely important property of compatibility. Furthermore, one of these plasticizers, the well-known trichloroethyl phosphate, is even deficient as regards efficiency and yet another offers little if any flame retardancy. It is thus seen that the present invention offers many advantages over presently used commercial plasticizers.

*Example VI*

When 1,2-bis[di(β-chloroisopropyl)phosphonato]propane in the formulation of Example V and similar films are prepared, the films have good flame-proofing properties and provide very good compatibility and efficiency.

*Example VII*

Example V was repeated in all details except that the plasticizer consists of a mixture of 5 parts 1,2-bis[di(β-chloroisopropyl)phosphonato]propane and 45 parts of dioctyl phthalate rather than 50 parts 1,2-bis[di(β-chloroisopropyl)phosphonato] propane. In other words, 10 percent of the dioctyl phthalate was replaced by 1,2-bis[di(β - chloroisopropyl)phosphonato]propane. The foregoing tests of Example V were then repeated but the result was that excellent compatibility and efficiency were obtained by the use of this plasticizing mixture, whereas in the above demonstration, it is noted that dioctyl phthalate when used alone shows poor compatibility. Furthermore, the plasticizing mixture using an an ingredient, a compound of the present invention, provided excellent flame retardancy whereas dioctyl phthalate alone is a poor flame-retardant.

*Example VIII*

When 30 parts per 100 parts of 1,2-bis[di(β-chloroisopropyl)phosphonato]propane was added to polystyrene and a film cast as in Examples V–VII the resulting composition was found to be self-extinguishing.

*Example IX*

When 17 parts, per 100 parts of plastic, of 1,2-bis[di-(β-chloroisopropyl)phosphonato]propane is incorporated into polymethyl methacrylate a flame-resistant film is also formed.

*Example X*

When 12 parts, per 100 parts total weight of plasticized mixture, of 1,2 - bis[di(β-chloroisopropyl)phosphonato] propane is added to a standard urethane foam system the foam becomes flame-resistant.

*Example XI*

When 1,2 - bis[di(β-chloroisopropyl)phosphonato]propane is mixed with three times its weight of a high molecular weight polystyrene molding powder and this mixture fed into an extruder operated at a temperature of about 180° C. the extruded product is found to be quite heat stable as well as flame retardant, no significant amount of degradation of the product occurring. When the extruded mixture is hardened and cut into thin strips and a flame applied directly to these strips it is found that the plastic material is flame resistant and self-extinguishing. When the compound is burning, it is also found that the heat generated from the burning material is quite low.

Similarly good results are obtained when this run is repeated and the phosphonate is employed as a plasticizer with polyvinyl chloride, polyvinyl acetate, copolymers of polyvinyl chloride and polyvinyl acetate (80 percent polyvinyl chloride and 20 percent polyvinyl acetate) and also with vinylidene chloride and a copolymer of polyvinyl chloride and vinylidene chloride (85 percent polyvinyl chloride and 15 percent vinylidene chloride).

In sharp contrast when the ester from which the dimer is prepared—viz., bis(β - chloroisopropyl)α' - chloropropane phosphonate—is blended in styrene and is subjected to the same treatment decomposition of the plastic results. A noxious odor is given off and the plastic is found to bleed.

*Example XII*

Several specimens of cellulose acetate and several specimens of cotton fabric are thoroughly impregnated with a saturated solution of 1,2 - bis[di(β - chloroisopropyl)

phosphonato]propane in pentane and then the materials dried at 100° C. in a vacuum oven. The cellulose acetate fibers, containing approximately 15 percent of the phosphonate, is found to be very flame-resistant and remains so even after several washings. Further, the "hand" of the material is satisfactory in all respects.

The specimens of cotton fabric, containing from 10–15 percent of the phosphonate ester, are found to be highly flame-resistant and remain so even after several launderings in aqueous neutral soap solutions.

Equally satisfactory results are obtained when the cellulose acetate and cotton fabrics are treated with 1,2-bis[di($\beta$-chloroethyl)phosphonato]ethane,
1,2-bis[di($\alpha$-butyl-$\beta$-chloroethyl)phosphonato]hexane,
1,2-bis[di($\alpha$-butyl-$\beta$-bromoethyl)phosphonato]hexane,
1,2 - bis[di($\alpha$-phenyl-$\beta$-chloroethyl)phosphonato]octane,
1-phenyl-1,2-bis[di($\alpha$-phenyl-$\beta$-bromoethyl)phosphonato]ethane,
1,2-bis[di($\beta$-chloroethyl)phosphonato]ethane, and
1,2-bis[di($\beta$-bromoethyl)phosphonato]ethane.

*Example XIII*

Each of the phosphonates of Example XII are, respectively, dissolved in carbon tetrachloride to form saturated solutions. Various paper and cardboard materials are then immersed within the carbon tetrachloride solutions. These materials are removed from the liquid, air dried and then placed in a vacuum oven at a temperature of 100° C. for twenty minutes. A flame is touched to each of the paper articles. It is found that the paper articles, in general, burn for only a few seconds, then cease burning.

*Example XIV*

Seventy parts of polyvinyl chloride-polyvinyl acetate copolymer (80 parts polyvinyl chloride and 20 parts polyvinyl acetate) are intimately mixed with 30 parts by weight of 1,2-bis[di($\beta$-chloroisopropyl)phosphonato]propane and 30 parts of dioctyl phthalate and the mixture worked on a roll mill at 150° C. until homogeneous composition is formed. A portion of this composition is molded into a sheet 0.04 inch in thickness. When flame is applied to this mixture it is found that the material is non-inflammable.

*Example XV*

Twenty parts by weight of 1,2-bis[di($\beta$-chloroisopropyl)phosphonato]propane is thoroughly mixed with 100 parts of a prepolymer of tolylenediisocyanate and poly(propylene oxide)glycol, 0.5 part of a silicone oil, and 2 parts of N-methyl morpholine. Addition of 2.2 parts of water to the mixture produces a polyurethane foam with a density of about 2.6 pounds per cubic foot. Unlike the foam produced without the presence of the diphosphonate additive, the product is flame resistant and self-extinguishing.

*Example XVI*

Fifteen parts of 1,2 - bis[di($\beta$ - chloroisopropyl)phosphonato]propane is incorporated with the monomeric formaldehyde formed by pyrolytic treatment for one and one-half hour of seventy parts of alpha-polyoxymethylene. The reaction mixture is placed in a reaction chamber at −30° C. and rapidly agitated with 525 parts of decahydronaphthalene and 5 parts of non-ionic dispersing agent formed by complete esterification with oleic acid of polyethylene glycol (having a molecular weight of 400). The formaldehyde is introduced continuously in cold mixture with nitrogen (−15° C.) during the one and one-half hour period and the other ingredients are charged initially into the reaction vessel. The polymer is stirred for a total period of two hours, thirty minutes after polymerization is substantially complete or thirty minutes after the flow of formaldehyde to the vessel had been completed. The system is filtered with suction, the product then washed with ether, then air and vacuum dried to yield the formaldehyde polymer.

A strip of the formaldehyde polymer is found to be flame-resistant.

*Examples XVII–XXI*

Copolymerization runs are made employing a bulk polymerization technique. Propene, 1-butene, 2-butene, 1-hexene and 2-hexene are individually employed as monoolefinic monomers. By adding 3 parts of 1,2-bis-[di($\beta$-chloroisopropyl)phosphonato]propane and reacting 20 parts of trioxane under dry nitrogen with one part of the olefinic monomer in the presence of boron trifluoride diethyl etherate catalyst and heating the mixture to the melting point (70° C.) while stirring, polymers are formed which have very good flame-resistant properties.

*Example XXII*

Into a reaction pot equipped with a high speed stirrer is charged 100 parts of trioxane, 220 parts of benzene and 35 parts of 1,2-bis[di($\beta$-chloroisopropyl)phosphonato]propane. The essentially anhydrous reaction mixture is flushed with dry nitrogen. Dry propene is passed into the stirred solution and 0.1 part of boron trifluoride etherate catalyst is added. Stirring accompanied with admission of propene is continued for 6 hours with another 0.1 part of catalyst added hourly.

Methyl alcohol (158 parts) is thereafter added to the reaction mass and the suspension of polymer is filtered. The polymer is then extracted with benzene for one hour and allowed to dry in the air after which it is dried in vacuum. The resultant polymer is found to have very good flame-resistant properties.

*Example XXIII*

To a reactor is added 95 parts of trioxane and 5 parts of purified styrene with 100 parts of cyclohexane solvent and 0.09 part by volume of boron trifluoride dibutyl etherate catalyst. In addition, is added 40 parts of 1,2-bis[di-($\beta$-chloroisopropyl)phosphonato] propane. The mixture is stirred for one minute and then heated to 55° C. for one hour. After this time, the reaction mass is treated with 100 parts by volume of methanol after which the polymer is transferred to a high speed mixer and dispersed in methanol. The polymer is then collected and dried at 50° C. in vacuo. The yield of the desired copolymer is 40 percent. The polymer is found to have good properties of flame-resistance.

The esters of this invention not only produce flame resistant compositions but also provide plasticizing properties which render various plastic compositions less brittle and more easily workable. The esters can be incorporated into the plastic or other compositions by any of the well-known methods. For example, the ester can be dissolved within polyvinyl chloride at elevated temperatures. Thus, the mixing can be done, for example, on a heated roll mill or in an internal mixer. Also, these esters can be blended in with the various monomeric materials prior to polymerization in a normal polymerization recipe, as in emulsion and suspension polymerization systems.

The flame-retarding agent of the present invention can be used in considerably wide proportions in various materials to provide good fire-resistant properties for the various articles of manufacture. The amount of the presently contemplated halogenated organic diphosphonate esters can range as high as 50 weight percent, and higher. Thus, where the ester is incorporated within cellulose acetate and other thermoplastic cellulose derivatives to form transparent sheets and lacquers as high as 50 weight percent can be used, even though in conjunction with other plasticizers which are used to impart other desirable characteristics. Obviously, however, lesser amounts, and even very small amounts, of the flame-retarding agent of this invention can be used in some applications with advantage. Thus, non-inflammable cellulose acetate sheeting is made for example, with the present flame-retarding agents present in proportions of 30–50 weight percent, based on the total weight of the cellulose acetate sheeting. On the other hand, as little as one weight percent concentration of the additives can provide advantages in some applications.

The present additives are very useful and very effective in polyester and polyurethane resins. Generally as high as 25 percent of the additive can be incorporated into these resins with good compatibility. In concentrations as high as 15–20 percent there is yielded a resin having good self-extinguishing characteristics. The "flexibility" properties of the resultant polyurethane are not significantly altered where the polyurethane foam is used as a latex.

Polyvinyl acetate films and coatings are rendered flame-retarding generally by the incorporation therein, preferably, of from about 10 to 15 percent of the present diphosphonate additives.

The present additives are excellent plasticizers for polyvinyl chloride and more effective than many phosphate esters commonly used. The present additives are compatible in concentrations ranging as low as one-half and as high as 25 percent and provide particularly good flame-retaring properties when used in concentrations of from about 5–15 percent.

Any of the compounds in this invention can be incorporated into or blended with various cellulosic, textile, paper and plastic materials in any range of concentration as may be required depending upon the nature of the materials to which the compound is added. These compounds or flame retardant agents are most generally used in concentration ranging from about 0.5 weight percent to as much as 25 weight percent, and more for special purposes. These flame-retarding agents can be used alone or in admixture with each other. Also, they can be used in conjunction with other additives, including other flame-retarding agents.

The solvents which may be employed in any of the solution polymerization processes or in the process of manufacturing these diphosphonates are any solvents which are inert to the reactants. Thus, liquid hydrocarbons (paraffins, cycloparaffins, aromatics, or mixtures of these), glycol ethers, inert monoethers (dialkyl ethers, dicycloalkyl ethers, diaryl ethers, diaralkyl ethers, or mixed ethers in which the organic groups are taken from different classes—viz., alkyl, cycloalkyl, aryl and aralkyl groups), saturated halohydrocarbons, and the like may be employed. Typical of these solvents are hydrocarbons such as hexane, heptane, octane, cyclohexane, methylcyclohexane, benzene, toluene, xylene, petroleum distillates such as naphtha, kerosene, and gasoline, halogenated hydrocarbon compounds such as carbon tetrachloride, ethylene dibromide, methylene chloride, glycol ethers such as the dimethyl ether of diethylene glycol, the diethyl ether of diethylene glycol, monoethers such as diethyl ether, dibutyl ether, dicyclohexyl ether, dibenzyl ether, diphenyl ether, methyl phenyl ether and the like.

Having described the invention, what is claimed is:

1. A flame resistant composition consisting essentially of a normally flammable organic polymer within which is incorporated from about 0.5 to about 50 weight percent of a compound having the formula

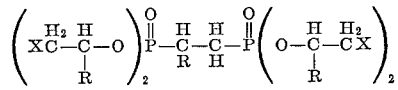

wherein R is selected from the group consisting of hydrogen, alkyl radicals, and aryl radicals, said radicals containing from 1 to about 6 carbon atoms each, and X is selected from the group consisting of chlorine and bromine.

2. The composition of claim 1 further characterized in that said compound is present in an amount within the range of from about 0.5 to about 25 weight percent.

3. The composition of claim 1 further characterized in that said compound is present in an amount within the range of from about 5 to about 15 weight percent.

4. The composition of claim 1 further characterized in that said compound is incorporated in a normally flammable organic polymer selected from the group consisting of polystyrenes, polyvinylacetate, polyvinyl chloride, polyformaldehyde, polymethylmethacrylate, epoxy resins, unsaturated poly esters, and poly urethane foams.

5. The composition of claim 1 further characterized in that said compound is incorporated in a normally flammable organic polymer derived from an organic polymerizable monomer initially having ethylenic double bonds.

6. A flame resistant composition consisting essentially of a normally flammable organic polymer within which is incorporated from about 0.5 to about 50 weight percent of a mixture of compounds having the formulas:

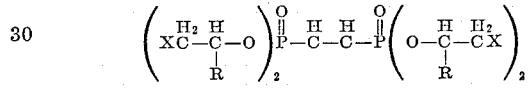

and

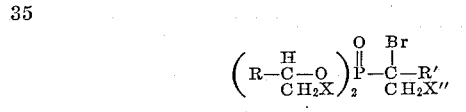

wherein R is selected from the group consisting of hydrogen, alkyl radicals, and aryl radicals, R' is selected from the group consisting of alkyl and aryl radicals, said radicals containing from 1 to about 6 carbon atoms each, X is selected from the group consisting of chlorine and bromine, and X" is selected from the group consisting of chlorine, bromine, and cyano; and the compound present in the mixture in the least amount is present in at least about 10 weight percent of other compound.

7. The composition of claim 6 further characterized in that said mixture of compounds consists essentially of 1,2 - bis - [di(beta - chloroisopropyl)phosphonato]propane and bis-(beta-chloroisopropyl)-2,3-dibromo-propane-2-phosphonate.

References Cited by the Examiner

UNITED STATES PATENTS 2,651,656  9/1953  Ladd et al. _____ 260—30.6
2,934,507  4/1960  Chadwick et al. ___ 260—461.310

MORRIS LIEBMAN, *Primary Examiner.*

ALEXANDER H. BRODMERKEL, *Examiner.*

A. O. DENT, B. A. AMERNICK, *Assistant Examiners.*